(12) United States Patent
Noh

(10) Patent No.: US 11,861,318 B2
(45) Date of Patent: Jan. 2, 2024

(54) METHOD FOR PROVIDING SENTENCES ON BASIS OF PERSONA, AND ELECTRONIC DEVICE SUPPORTING SAME

(71) Applicant: Samsung Electronics Co., Ltd., Suwon-si (KR)

(72) Inventor: Eunchung Noh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 353 days.

(21) Appl. No.: 17/311,559

(22) PCT Filed: Dec. 9, 2019

(86) PCT No.: PCT/KR2019/017293
§ 371 (c)(1),
(2) Date: Jun. 7, 2021

(87) PCT Pub. No.: WO2020/130447
PCT Pub. Date: Jun. 25, 2020

(65) Prior Publication Data
US 2022/0027574 A1 Jan. 27, 2022

(30) Foreign Application Priority Data
Dec. 18, 2018 (KR) .......................... 10-2018-0164198

(51) Int. Cl.
*G10L 13/033* (2013.01)
*G06F 40/35* (2020.01)
(Continued)

(52) U.S. Cl.
CPC ............ *G06F 40/35* (2020.01); *G06F 40/166* (2020.01); *G06F 40/253* (2020.01); *G06N 3/08* (2013.01); *H04L 51/02* (2013.01); *G10L 13/033* (2013.01)

(58) Field of Classification Search
CPC ..................................................... G10L 13/033
See application file for complete search history.

(56) References Cited

U.S. PATENT DOCUMENTS 7,571,226 B1 * 8/2009 Partovi ...................... H04L 9/40
709/224
8,949,725 B1 2/2015 Goncharuk et al.
(Continued)

FOREIGN PATENT DOCUMENTS

JP 6161656 B2 6/2017
KR 10-2016-0052506 A 5/2016
(Continued)

OTHER PUBLICATIONS

Korean Office Action dated Nov. 15, 2022, issued in Korean Patent Application No. 10-2018-0164198.
(Continued)

*Primary Examiner* — Feng-Tzer Tzeng
(74) *Attorney, Agent, or Firm* — Jefferson IP Law, LLP

(57) ABSTRACT

An electronic device according to various embodiments of the present invention may include a memory, and at least one processor, wherein the at least one processor may be configured to obtain a sentence based on a user input, based on obtaining the sentence, determine at least one persona, convert the sentence to at least one sentence having a style corresponding to the at least one persona, using a neural network, and provide the converted at least one sentence.

14 Claims, 9 Drawing Sheets

(51) Int. Cl.
*G06F 40/253* (2020.01)
*G06F 40/166* (2020.01)
*G06N 3/08* (2023.01)
*H04L 51/02* (2022.01)

(56) References Cited

U.S. PATENT DOCUMENTS

| | | |
|---|---|---|
| 9,275,641 B1 | 3/2016 | Gelfenbeyn et al. |
| 9,369,425 B2 | 6/2016 | Gelfenbeyn et al. |
| 9,380,017 B2 | 6/2016 | Gelfenbeyn et al. |
| 9,386,113 B1 | 7/2016 | Goncharuk et al. |
| 9,659,248 B1 * | 5/2017 | Barbosa ............... G06N 3/045 |
| 2003/0107606 A1 * | 6/2003 | Capps ............... G06F 9/44505 |
| | | 715/810 |
| 2009/0043583 A1 * | 2/2009 | Agapi ............... G10L 13/04 |
| | | 704/260 |
| 2009/0306959 A1 | 12/2009 | Rappoport et al. |
| 2014/0314228 A1 * | 10/2014 | Bushey ............... G10L 15/1822 |
| | | 379/266.07 |
| 2016/0098994 A1 | 4/2016 | Gelfenbeyn et al. |
| 2016/0179924 A1 * | 6/2016 | Ansari ............... G06F 40/157 |
| | | 707/740 |
| 2016/0259767 A1 | 9/2016 | Gelfenbeyn et al. |
| 2016/0259775 A1 | 9/2016 | Gelfenbeyn et al. |
| 2016/0260029 A1 | 9/2016 | Gelfenbeyn et al. |
| 2016/0349935 A1 | 12/2016 | Gelfenbeyn et al. |
| 2016/0350101 A1 | 12/2016 | Gelfenbeyn et al. |
| 2017/0337189 A1 | 11/2017 | Shin et al. |
| 2018/0046618 A1 | 2/2018 | Lee et al. |
| 2018/0150449 A1 | 5/2018 | Lee et al. |
| 2018/0329899 A1 | 11/2018 | Churchill et al. |

FOREIGN PATENT DOCUMENTS

| | | |
|---|---|---|
| KR | 10-2017-0004154 A | 1/2017 |
| KR | 10-2017-0061701 A | 6/2017 |
| KR | 10-2018-0017622 A | 2/2018 |
| KR | 10-2018-0060971 A | 6/2018 |
| WO | 2016/040769 A1 | 3/2016 |
| WO | 2016/191629 A1 | 12/2016 |
| WO | 2016/191630 A1 | 12/2016 |

OTHER PUBLICATIONS

Korean Notice of Patent Grant dated May 31, 2023, issued in Korean Application No. 10-2018-0164198.
Jhamtani et al., Shakespearizing Modern Language Using Copy-Enriched Sequence-to-Sequence Models, Language Technologies Institute Carnegie Mellon University, Jul. 20, 2017.
Hu et al, Toward Controlled Generation of Text, Sep. 13, 2018.
Shen et al., Style Transfer from Non-Parallel Text by Cross-Alignment, 31st Conference on Neural Information Processing Systems (NIPS 2017), Long Beach, CA, USA, Nov. 6, 2017.

* cited by examiner

| Standard language | Eoseo osibsio |
|---|---|
| Gyeongsang-do dialect | Peotteug oiso |
| Jeolla-do dialect | Heobeollage wabeolilangkke |
| Chungcheong-do dialect | Ppalli wayu |
| Jeju-do dialect | Honje obseoye |

Intents

Intents
- Product advertisement

Events
- Guide promotion

Persona & Style

Age
- ☑ 20s
- ☑ 30s
- ☑ 40s to 50s
- ☑ 60s and above
- ☑ Teenager
- ☐ Child
- ☐ None Gender
- ☑ Man
- ☑ Woman Characteristics
- ☐ Polite
- ☑ Friendly
- ☐ Humorous
- ☑ Assertive ● User ▼ ⚙

[Intents] [Entities]

FIG.8

METHOD FOR PROVIDING SENTENCES ON BASIS OF PERSONA, AND ELECTRONIC DEVICE SUPPORTING SAME

TECHNICAL FIELD

Various embodiments of the present invention relate to a method for providing a sentence based on a persona and an electronic device supporting the same.

BACKGROUND ART

Research is actively conducted on an interactive system (e.g., a chatbot) which provides various services through conversation with a person.

A chatbot may be defined as artificial intelligence-based communication software which provides an appropriate response (or information) for a question through the conversation (or text conversation) with the person.

DISCLOSURE OF INVENTION

Technical Problem

In the conventional art, an application programming interface (API) service (e.g., a chatbot builder service) for creating a chatbot is provided for a user (or a developer). For example, a graphical user interface (GUI) tool for creating the chatbot is provided. The user may create a chatbot by inputting a sample sentence (or training phrases) to be used for an input sentence (or intent matching) and a response sentence to the input sentence in the provided tool.

In the conventional art, if the user is to response sentences of various types with respect to the input sentence, the user may have inconvenience in inputting each of the response sentences individually.

Various embodiments of the present invention relate to a method for providing a sentence based on a persona and an electronic device supporting the sentence, which may provide sentences having various styles based on the persona with respect to a sentence inputted by a user.

The technical problems to be achieved by the present invention are not limited to the technical problems mentioned above, and other technical problems not mentioned may be clearly understood by those skilled in the art to which the present invention pertains from the following descriptions.

Solution to Problem

An electronic device according to various embodiments of the present invention may include a memory, and at least one processor, wherein the at least one processor may be configured to obtain a sentence based on a user input, based on obtaining the sentence, determine at least one persona, convert the sentence to at least one sentence having a style corresponding to the at least one persona, using a neural network, and provide the converted at least one sentence.

A method according to various embodiments of the present invention may include obtaining a sentence based on a user input, based on obtaining the sentence, determining at least one persona, converting the sentence to at least one sentence having a style corresponding to the at least one persona, using a neural network, and providing the converted at least one sentence.

Advantageous Effects of Invention

A method for providing a sentence based on a persona and an electronic device supporting the same according to various embodiments of the present invention may provide a more convenient and efficient development environment (or platform) to a user (or a developer) who is to create an interactive system, by providing sentences having various styles based on the persona even if the user inputs a single sentence.

BRIEF DESCRIPTION OF DRAWINGS

FIG. 4 is a diagram for illustrating a method for converting a sentence to a sentence having a style corresponding to a persona, according to various embodiments.

FIG. 8 is a diagram for illustrating a method for selecting a persona for providing a response by a user of an electronic device, according to various embodiments.

BEST MODE FOR CARRYING OUT THE INVENTION

Figure 1:
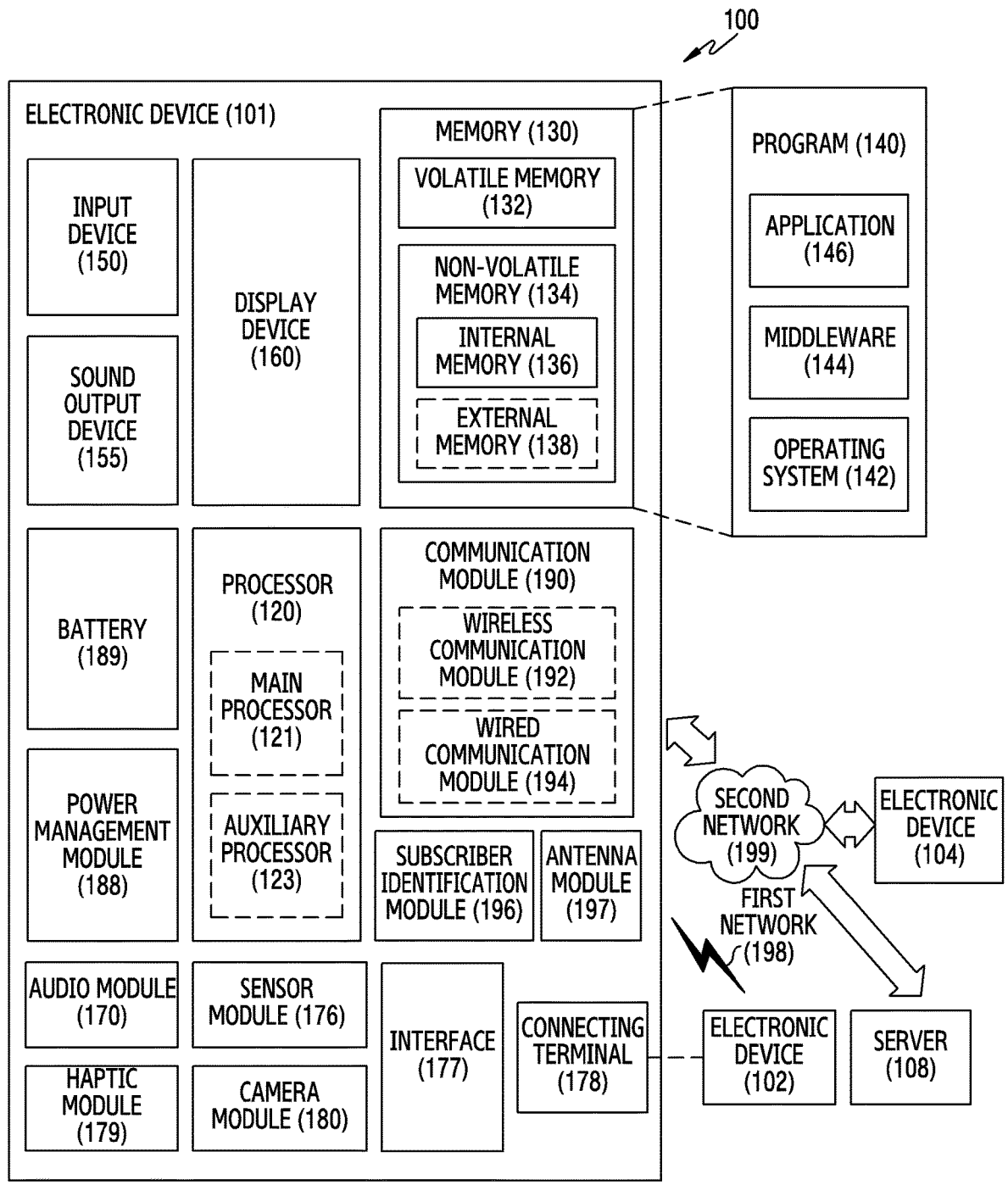
FIG. 1 is a block diagram of an electronic device in a network environment, according to various embodiments.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked.

The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
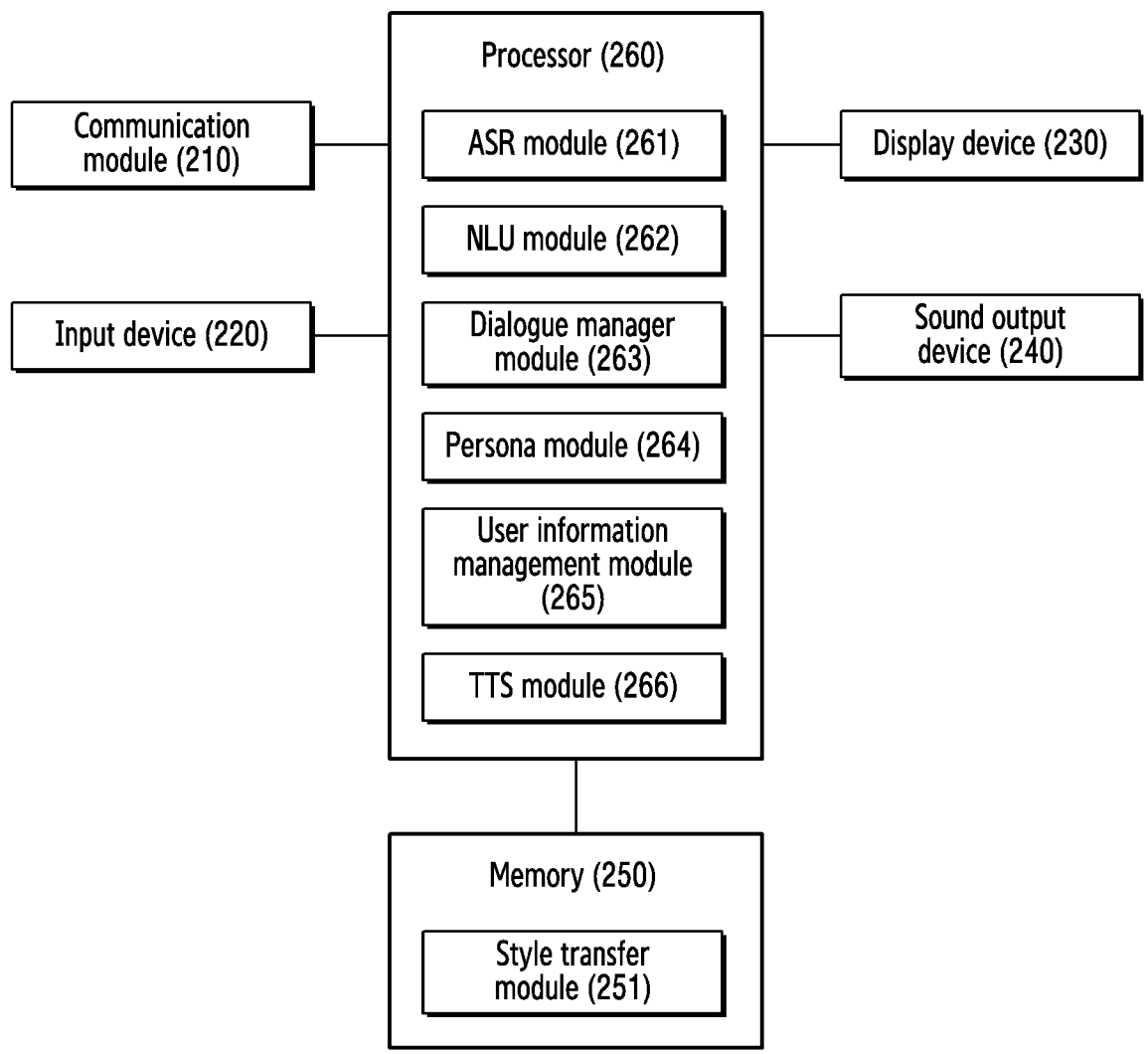
FIG. 2 is a block diagram of an electronic device for providing a sentence based on a persona, according to various embodiments.

FIG. 2 is a block diagram of an electronic device 101 for providing a sentence based on a persona, according to various embodiments.

Hereinafter, a 'persona' may be a character having unique linguistic features (or characteristics). In an embodiment, a 'persona' may be a character of an individual. For example, a 'persona' may be a character which reflects unique linguistic features of a user of a client device (e.g., a user of the electronic devices 102 and 104), a user of the electronic device 101, a character of a work (e.g., cartoon, movie), or a specific person (e.g., a celebrity). In an embodiment, a 'persona' may be a character for a plurality of persons. For example, a 'persona' may be a character which reflects common (or representative) linguistic features of people of a specific age group (e.g., people in their 30s). However, it is not limited thereto, and the 'persona' may be a character which reflects people's common linguistic features in relation to at least one of not only an age (e.g., infant, 10s, 20s, 30s, 40s through 50s, or 60s and above) but also a gender (e.g., male or female), an occupation (e.g., a bartender), a region (e.g., a region using a standard language or a region using a dialect), linguistic personality (e.g., polite, friendly, humorous, or assertive) or a product (or a service) (e.g., infant content).

In an embodiment, the electronic device 101 may be a developer's device (or server) for creating (or building) an interactive system (e.g., a chatbot). In an embodiment, the electronic device 101 may be a service provider's device for providing a service which responds to a request (e.g., a voice input for executing a command) from a user of a client device. However, it is not limited thereto, and in an embodiment, the electronic device 101 may be a client device including at least part of a configuration to be described.

Referring to FIG. 2, in an embodiment, the electronic device 101 may include a communication module 210, an input device 220, a display device 230, a sound output device 240, a memory 250, and a processor 260.

In an embodiment, the communication module 210 may communicate with another electronic device (e.g., a client device). For example, the communication module 210 may a configuration for receiving a voice input from another electronic device, and transmitting a response to the voice input. In an embodiment, the communication module 210 may be at least in part identical or similar to the communication module 190 of FIG. 1.

In an embodiment, the input device 220 may receive a user input from the user (or the developer). For example, the input device 220 may include a microphone for receiving a user's utterance as a voice signal. As another example, the input device 220 may include at least one of an input module for receiving a user input from an external device (e.g., a keyboard, a headset), a touch screen for receiving a text input from the user, or a hardware key. In an embodiment, the input device 220 may be at least in part identical or similar to the input device 150 of FIG. 1.

In an embodiment, the display device 230 may output various information, while the electronic device 101 performs an operation for providing a sentence based on a persona. For example, the display device 230 may display a graphical user interface (GUI) tool for creating (or constructing) the interactive system (or the chatbot). However, information displayed on the display device 230 is not limited thereto. In an embodiment, since the display device 230 is at least in part identical or similar to the display device 160 of FIG. 1, its detailed description will be omitted.

In an embodiment, the sound output device 240 may include a speaker for outputting a voice signal. In an embodiment, the sound output device 240 may output a voice to be provided in response to the voice input. In an embodiment, since the sound output device 240 is at least partially identical or similar to the sound output device 155 of FIG. 1, detailed descriptions thereof will be omitted.

In an embodiment, the memory 250 may store information required to provide a sentence based on a persona.

In an embodiment, the memory 250 may store a style transfer model 251. In an embodiment, the memory 250 may store the style transfer model 251 corresponding to the persona. In an embodiment, the memory 250 may store different style transfer models 251 according to personas.

In an embodiment, the style transfer model 251 corresponding to the persona may be a model for converting a response sentence inputted by the user to a response sentence having a style corresponding to the persona in response to a text input (e.g., an input sentence inputted for intent matching) to be used for the intent matching (or to be intent matched with the voice input received from the client device) or in response to a user input received from the client device.

For example, while creating the interactive system (e.g., a chatbot), an actually inputted text input (e.g., the voice input from the user (or the voice input to perform a voice command)) and the text input for the intent matching may be inputted from the user. As a sentence in response to the text input for the intent matching, a response sentence (hereafter, referred to as a 'first response sentence') having a certain (or arbitrary) style may be inputted by the user. The style transfer model corresponding to the persona may convert the response sentence having the certain style into a sentence having a style corresponding to the persona (hereafter, referred to as a 'second response sentence').

In an embodiment, the style transfer model corresponding to the persona may be trained using a neural network, based on a sentence (or set of sentences) having a first style and a sentence having a second style. Training the style transfer model corresponding to persona will be described later in detail with reference to FIG. 3.

In an embodiment, the memory 250 may store sentences having styles corresponding to personas for each persona. In an embodiment, if the sentence having the style corresponding to the persona is inputted based on a user input of the electronic device 101 (or a user input of the client device), based on an additionally inputted sentence, the style transfer model corresponding to the persona may be trained (or updated or retrained).

In an embodiment, the memory 250 may store information of the user. For example, the memory 250 may store profile information of a user (or the user of the client device) registered (or subscribed) to a service provided by the electronic device 101. As another example, the memory 250 may store profile information of a provider (or a developer) of the service provided by the electronic device 101.

In an embodiment, the memory 250 may include a database including a tagged corpus (or corpus), a database related to context, and a database related to statistics and/or usage.

In an embodiment, the memory 250 may be at least in part identical or similar to the memory 130 of FIG. 1.

In an embodiment, the processor 260 may control the overall operation performed by the electronic device 101.

In an embodiment, the processor 260 may include an automatic speech recognition (ASR) module 261, a natural language understanding (NLU) module 262, a dialogue manager module 263, a persona module 264, a user information management module 265, and a text to speech (TTS) module 266.

In an embodiment, the ASR module 261 may convert a voice input inputted from the user of the electronic device 101 or the user of the client device to text data.

In an embodiment, the ASR module 261 may include an acoustic model, a language model, and a speech recognition module. For example, the acoustic model may include information related to speech, and the language model may include unit phoneme information or information of a combination of the unit phoneme information. The speech recognition module may convert the user speech to the text data by using information related to speech or information of the unit phoneme information.

In an embodiment, the NLU module 262 may acquire a user's intent by performing syntactic analysis or semantic analysis. For example, the NLU module 262 may acquire meaning of a word extracted from the user input by using linguistic features (e.g., grammatical elements) such as morphemes or phrases, and determine the user's intent by matching the acquired word meaning to a domain and an intent.

In an embodiment, the NLU module 262 may include a module for performing a part-of-speech (POS) tagging operation for tagging information of a POS (e.g., a verb, a noun, an adjective) of the word with respect to the corpus (or corpus).

In an embodiment, the dialogue manager module 263 may determine whether the user's intent acquired by the NLU module 262 is clear. For example, the dialogue manager module 263 may determine whether the user's intent is clear, based on whether parameter information is sufficient. In an embodiment, the dialogue manager module 263 may perform a feedback requesting necessary information from the user if the user's intent is not clear.

In an embodiment, the persona module 264 may generally control an operation of providing the sentence based on the persona.

In an embodiment, the persona module 264 may control an operation of training the style transfer module corresponding to the persona using the neural network, based on the sentence having the first style and the sentence having the second style.

In an embodiment, the persona module 264 may control an operation for converting a first response sentence inputted by the user to a second response sentence having the style corresponding to the persona in response to the text input to be used for the intent matching.

In an embodiment, the persona module 264 may obtain the first response sentence inputted by the user in response to the text input to be used for the intent matching.

In an embodiment, the persona module 264 may determine at least one persona for generating at least one second response sentence (or corresponding to the style of the second response sentence), based on obtaining the first response sentence.

In an embodiment, based on obtaining the first response sentence, the persona module 264 may determine one or more personas corresponding to one or more style transfer modules of all of style transfer models stored in the memory 250 as personas for generating second response sentences.

In an embodiment, the persona module 264 may determine at least one persona, based on a service (or product or content) provided by the user of the electronic device 101. For example, if the user of the electronic device 101 is a service provider who provides a service for providing information of women's clothing, the persona module 264 may determine a persona (e.g., a female character) related to the women's clothing information.

In an embodiment, the persona module 264 may determine at least one persona, based on user (or developer) information (or profile information) of the electronic device 101.

In an embodiment, based on obtaining the first response sentence, the persona module 264 may determine at least one persona selected by the user of the electronic device 101 among the one or more personas corresponding to one or more style transfer modules of all the style transfer models stored in the memory 250 as at least one persona for generating at least one second response sentence. For example, the persona module 264 may display on the display device 230 information indicating the one or more personas corresponding to the one or more style transfer modules of all the style transfer models stored in the memory, based on obtaining the response sentence inputted by the user. Based on a user input for selecting at least one persona in the information indicating the one or more personas, the persona module 264 may determine the at least one selected persona as at least one persona for generating the second response sentence.

In an embodiment, the persona module 264 may convert the first response sentence to at least one second response sentence having the style corresponding to the at least one determined persona, using the neural network.

In an embodiment, using the at least one style transfer module corresponding to the at least one determined persona trained through the neural network, the persona module 264 may generate (or acquire) at least one second response sentence, by converting the first response sentence to at least one second response sentence having the style corresponding to the at least one persona determined.

In an embodiment, the persona module 264 may receive a user input from the client device. For example, the persona module 264 may receive the user input for executing the command from the client device, through the communication module 210.

In an embodiment, the persona module 264 may determine at least one persona for providing the response.

In an embodiment, the persona module 264 may determine a persona for providing the response, based on the user information of the client device. For example, if the user of the client device is a user residing in an area using a specific dialect, the persona module 264 may determine a persona related to the specific dialect as the persona for providing the response.

In an embodiment, the persona module 264 may determine the persona for providing the response, based on the user information of the client device and the persona selected by the user of the electronic device 101 (e.g., at least one response sentence corresponding to at least one persona selected by the user of the electronic device 101) while generating the interactive system (e.g., the chatbot). For example, the persona module 264 may determine a persona (e.g., a persona related to information that the user's age is 30s) corresponding to the user information (e.g., information that the user's age is 30s) of the client device among at least one persona selected by the user of the electronic device 101 while creating the interactive system (e.g., the chatbot) as the persona for providing the response.

In an embodiment, the persona module 264 may determine the persona for providing the response, based on the user information of the electronic device 101. In an embodiment, the persona module 264 may determine the persona for providing the response, based on a service (or content) provided by the user of the electronic device 101. For example, if the service provided by the user of the electronic device 101 is a service for providing cocktail information, the persona module 264 may determine a persona related to a professional bartender as the persona for providing the response.

In an embodiment, the persona module 264 may determine the persona for providing the response, based on content requested by the user of the client device. For example, if the user of the client device requests information related to infant content, the persona module 264 may determine a persona related to an infant as the persona for providing the response.

In an embodiment, the persona module 264 may determine the persona for providing the response, based on user setting of the electronic device 101. For example, if the user of the electronic device 101 sets a first persona as the persona for providing the response, the persona module 264 may determine the first persona as the persona for providing the response.

In an embodiment, the persona module 264 may generate a sentence having a style corresponding to the determined persona.

In an embodiment, the persona module 264 may generate a sentence having a style corresponding to the determined persona using the style transfer module corresponding to the determined persona.

For example, the persona module 264 may generate a sentence having a first style in response to a received user input of the client device. The persona module 264 may generate a sentence as the response, by converting the sentence having the generated first style to a sentence having the second style corresponding to the persona using the transfer module corresponding to the determined persona.

In an embodiment, the user information management module 265 may manage information of the user of the electronic device 101 or the user of the client device. For example, if profile information of the user of the user of the electronic device 101 or the user of the client device is added or changed, the user information management module 265 may update the user information stored in the memory 250, by considering the added or changed profile information.

In an embodiment, the TTS module 266 may change text-type information to voice-type information. For example, the TTS module 266 may change the text-type sentence generated as the response through the persona module 264 to voice-type information.

In an embodiment, the TTS module 266 may change a text-type sentence generated as the response through the persona module 264 to voice-type information reflecting persona's tone. For example, the TTS module 266 may change the text-type sentence generated as the response through the persona module 264 to the voice-type information which reflects at least one of persona's speech rate, accent, pitch, or habit.

In FIG. 2, the processor 260 includes all of the ASR module 261, the NLU module 262, the dialogue manager module 263, the persona module 264, the user information management module 265, and the TTS module 266, but is not limited thereto. For example, some of the ASR module 261, the NLU module 262, the dialogue manager module 263, the persona module 264, the user information management module 265, and the TTS module 266 may be omitted. As another example, at least one module of the ASR module 261, the NLU module 262, the dialogue manager module 263, the persona module 264, the user information management module 265, or the TTS module 266 may be a configuration independent of the processor 260.

In an embodiment, the ASR module 261, the NLU module 262, the dialogue manager module 263, the persona module 264, the user information management module 265, and the TTS module 266 may be stored in the memory 250, and may be executed by the processor 260 (e.g., the main processor 121).

In an embodiment, the processor 260 may be at least in part identical or similar to the processor 120 of FIG. 1.

Figure 3:
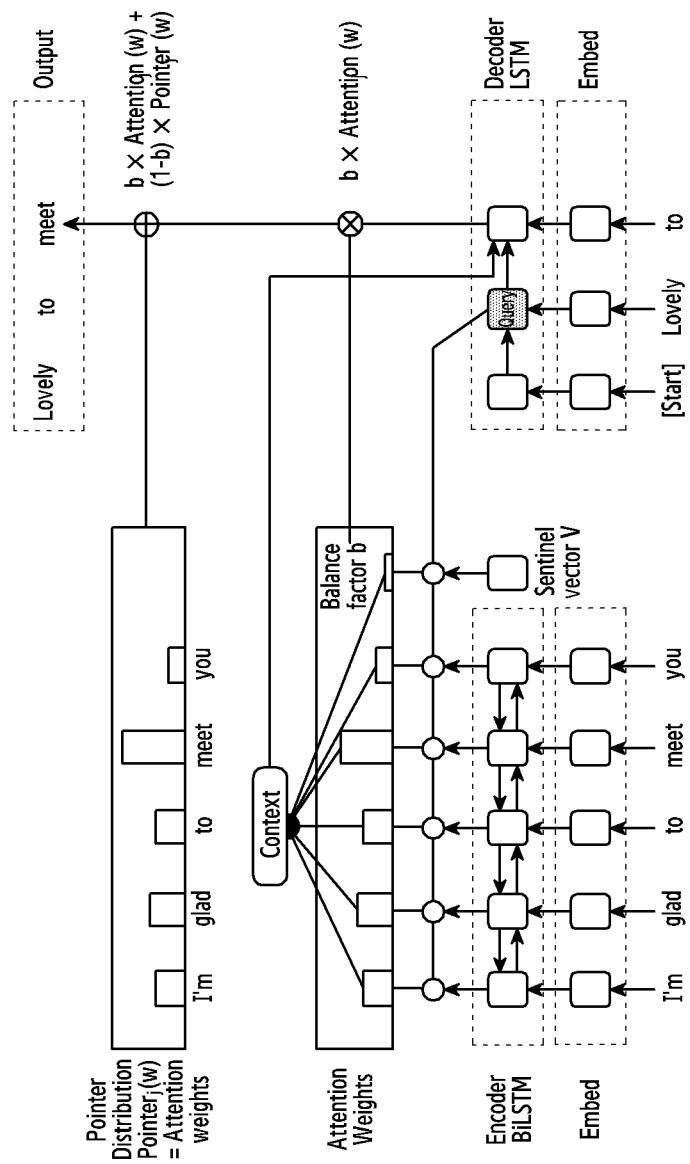
FIG. 3 is a diagram for illustrating a method for training a style transfer model corresponding to a persona, according to various embodiments.

FIG. 3 is a diagram for illustrating a method of training a style transfer model corresponding to a persona using a neural network, according to various embodiments.

Referring to FIG. 3, in an embodiment, FIG. 3 may depict a style transfer model for converting a sentence 'I'm glad to meet you' having the first style to a sentence 'Lovely to meet ya' having a second style.

In an embodiment, the input (or the input sentence) and the output (or the output sentence) of the style transfer model may be expressed as the following Equation 1.

$$X=[X_1, X_2, \ldots, X_N]$$

$$Y=[Y_1, Y_2, \ldots, Y_M] \quad \text{Equation 1}$$

In Equation 1, $X_i$ may denote an input word, X may denote a group of $X_i$ (or a sentence to transfer), and N may denote a length of the input sentence. In addition, $Y_j$ may denote an output word, Y may denote a group of $Y_j$ (or a sentence after transfer), and M may denote a length of the output sentence.

In an embodiment, in FIG. 3, X=[I'm, glad, to, meet, you], and Y=[Lovely, to, meet, . . . ]. Since FIG. 3 presents an operation for predicting the word 'meet', in [Lovely, to, meet, . . . ], ' ' may indicate a state where an operation for predicting 'ya' as the next word 'meet' is not conducted.

In an embodiment, a j-th output word (e.g., 'meet') may be calculated based on an attentional distribution, a pointer distribution, and a balance factor. In an embodiment, the distribution may mean a probability distribution.

In an embodiment, in FIG. 3, the attentional distribution may be expressed as Attention$_j$(w). Attention$_j$(w) may denote a probability of generating the word w as the j-th word of the output sentence.

In an embodiment, in FIG. 3, the pointer distribution may be expressed as Pointer$_j$(w). Pointer$_j$(w) may denote a probability of outputting the word w included in the input sentence as the j-th word of the output sentence.

In an embodiment, the attentional distribution may be related to the role of converting the style by considering context (or context), and the pointer distribution may be related to the role of maintaining content of the sentence. In an embodiment, the content of the input sentence may be maintained and the sentence of the converted style may be outputted, by the calculation operations based on the attentional distribution and the pointer distribution.

In an embodiment, using the following Equation 2, the j-th word may be calculated, based on the attentional distribution, the pointer distribution, and the balance factor.

$$\text{Output}_j(w) = b \times \text{Attention}_j(w) + (1-b) \times \text{Pointer}_j(w)$$

$$w_j = \text{argmax}_w(\text{Output}_j(w)) \qquad \text{Equation 2}$$

In Equation 2, b may denote the balance factor, Output$_j$(w) may denote a result of summing the attentional distribution and the pointer distribution using the balance factor, and $w_j$ may denote a j-th output word.

In an embodiment, argmax$_w$(Output$_j$(w)) may denote a function for selecting the word w to maximize Output$_j$(w).

Hereafter, a method for calculating each of the attentional distribution, the pointer distribution, and the balance factor, and calculating the j-th word based on the calculated attentional distribution, the pointer distribution, and the balance factor will be described in detail.

In an embodiment, an embedding operation 301 may be performed on the input words. In an embodiment, the embedding operation 301 may be an operation for tokenizing the input words. In an embodiment, the embedding operation 301 may generate a one-hot vector corresponding to a word token, and generate a word embedding vector by multiplying the one-hot vector by a word embedding matrix.

In an embodiment, after conducting the embedding operation 301, an encoding operation 303 may be performed. In an embodiment, a bidirectional long short-term memory (BiLSTM) may be used as an encoder to perform the encoding operation. In an embodiment, by using Equation 3 below, a hidden state of the encoder may be generated, by inputting the embedding vector into the BiLSTM.

$$h_i^{enc} = \text{BiLSTM}(E_{enc}(X_i)) \qquad \text{Equation 3}$$

In Equation 3, $h_i^{enc}$ may denote the hidden state of the encoder, and $E_{enc}(X_i)$ may denote the embedding input word.

In an embodiment, an attention weight may be calculated, using the following Equation 4.

$$e_{ij} = \tanh(h_i \times s_{j-1}) \qquad \text{Equation 4}$$

$$a_{ij} = \frac{e_{ij}}{\sum_{k=1}^{N} e_{kj}}$$

In Equation 4, $s_{j-1}$ may denote a j−1-th hidden state of the decoder, and $h_i$ may denote the j-th hidden state of the encoder. $a_{ij}$ may denote the attention weight. In an embodiment, for sake of explanations in Equation 4, k=1 through N are calculated in $\Sigma_{k=1}^{N} e_{kj}$, but considering a sentinel vector to be described, $E_{k=1}^{N} e_{kj}$ may be replaced by $\Sigma_{k=1}^{N+1} e_{kj}$.

In an embodiment, using the following Equation 5, a context vector may be calculated.

$$C_j = \Sigma_{i=1}^{N} a_{kj} h_i \qquad \text{Equation 5}$$

In Equation 5, $C_j$ may denote a j-th context vector.

In an embodiment, the j-th hidden state of the decoder may be calculated, using the following Equation 6.

$$S_j = \text{LSTM}(S_{j-1}, [\text{Embed}_{dec}(y_{j-1}); C_j]) \qquad \text{Equation 6}$$

In Equation 6, $S_j$ may denote the j-th hidden state of the decoder, $S_{j-1}$ may denote the j−1-th hidden state of the decoder, $y_{j-1}$ may denote a j−1-th real word (or ground truth), Embed$_{dec}(y_{j-1})$ may denote the embedding vector of $y_{j-1}$, $C_j$ may denote the j-th hidden state of the decoder, and [Embed$_{dec}(y_{j-1})$; $C_j$] may denote a vector which concatenates (or associates) Embed$_{dec}(y_{j-1})$ and $C_j$.

In an embodiment, a long short-term memory (LSTM) may be used as a decoder for performing the decoding operation, and $S_1$ may be calculated by inputting [Embed$_{dec}(y_{j-1})$; $C_j$] into the LSTM.

In an embodiment, the attentional distribution may be calculated, using the following Equation 7.

$$\text{Attention}_j(w) = \text{softmax}(W_{weightmatrix} \times [S_j; C_j]) \qquad \text{Equation 7}$$

In Equation 7, $W_{weightmatrix}$ may denote a weight matrix, and [$S_j$; $C_j$] may denote a vector which concatenates $S_j$ and $C_j$. softmax( ) may denote a softmax function as an activation function.

In an embodiment, the pointer distribution may be calculated using the following Equation 8.

$$\text{Pointer}_j(w) = \Sigma_{i \in I(w,X)} a_i \qquad \text{Equation 8}$$

In Equation 8, Pointer$_j$(w) may denote a probability that the word w is outputted as the j-th word of the output sentence, I(w,X) may denote every position including the word w in the input sentence X, and $a_i$ may denote a probability that the word w at the i-th position of the input sentence is outputted as the j-th word of the output sentence.

In an embodiment, the balance factor (b) may be calculated based on the sentinel vector. In an embodiment, the sentinel vector may be considered an N+1-th hidden state of the encoder.

In an embodiment, the balance vector may be calculated using the following Equation 9.

$$e_{(N+1)j} = \tanh(V \times s_{j-1})$$

$$b = a_{(N+1)j} = \frac{e_{(N+1)j}}{\sum_{k=1}^{N+1} e_{kj}}$$

Equation 9

In Equation 9, V may denote the sentinel vector, and b may denote the balance factor.

In an embodiment, to correct an error (or an error), the following Equation 10 may be used.

$$\text{error} = -\Sigma_{t-1}^{M} \log \text{Output}_t(y_t)$$
Equation 10

In Equation 10, Output$_t(y_t)$ may denote a predicted probability (or a predicted probability distribution) of a t-th word $y_t$. In an embodiment, training of the style transfer model may be conducted to minimize the error.

In an embodiment, FIG. 3 illustrates the operation of predicting the word 'meet', but it may be applied to other output words in the same or similar manner.

In an embodiment, the input sentence of FIG. 3 may correspond to the sentence having the first style, and the output sentence may correspond to the sentence having the second style.

In an embodiment, although FIG. 3 illustrates one style transfer model, a style transfer model for each persona (or for each style corresponding to the persona) may be trained in the same or similar manner to the method described in FIG. 3. In an embodiment, the trained style transfer model may be stored in the memory 250, together with the sentences used for the training.

In an embodiment, FIG. 3 has been described by exemplifying recurrent neural networks (RNN) as the neural network, but it is not limited thereto. For example, the style transfer model may be trained, using convolutional neural networks (CNN), deep belief networks, and restricted boltzman machines.

FIG. 4 is a diagram for illustrating a method of converting a sentence to a sentence having a style corresponding to a persona, according to various embodiments.

Referring to FIG. 4, in an embodiment, FIG. 4 may show a table which converts a sentence using a standard language as the first style corresponding to the first persona to a sentence using a dialect as the second style corresponding to the second persona.

For example, a sentence 'Eoseo osibsio' using the standard language may be converted to a sentence 'Peotteug oiso' using Gyeongsang-do dialect corresponding to a 2-1 persona, a sentence 'Heobeollage wabeolilangkke' using Jeolla-do dialect corresponding to a 2-2 persona, a sentence 'Ppalli wayu' using Chungcheong-do dialect corresponding to a 2-3 persona, and a sentence 'Honje Obseoye' using Jeju-do dialect corresponding to a 2-4 persona.

In an embodiment, if the sentence 'Eoseo osibsio' using the standard language is inputted from the user (or the developer) as a first response sentence, the processor 260 may provide (or recommend) 'Peotteug oiso', 'Heobeollage wabeolilangkke', 'Ppalli wayu', and 'Honje Obseoye', as second response sentences.

In an embodiment, the style corresponding to the persona may include a style of the user of the client device, the user of the electronic device 101, a character of a work (e.g., cartoon, movie), or a character reflecting unique linguistic features of a specific person (e.g., a celebrity).

For example, the processor 260 may convert a sentence such as 'Schedule will be postponed' having the first style to a sentence such as 'It will be later than expected pika pika~' having a style corresponding to a cartoon character, 'I think the schedule will be a little late' with a style corresponding to a specific celebrity, and a sentence such as 'Master schedule is expected to be postponed' with a style corresponding to a movie character.

In an embodiment, the processor 260 may convert the first response sentence to a sentence corresponding to a persona (or a persona generated by characterizing the client user by reflecting the language features of the client user) for the user of the client device, based on statistics (or history, or log of the input) of the input (e.g., the voice input for executing the command) inputted from the user of the client device.

In an embodiment, the processor 260 may convert the first response sentence to a sentence corresponding to a persona (or a persona generated by characterizing the electronic device 101 user by reflecting the language features of the user of the electronic device 101) for the user of the electronic device 101, based on statistics of the input (e.g., the voice input for executing the command) inputted from the user of the electronic device 101.

An electronic device according to various embodiments of the present invention may include a memory, and at least one processor, wherein the at least one processor may be configured to obtain a sentence based on a user input, based on obtaining the sentence, determine at least one persona, convert the sentence to at least one sentence having a style corresponding to the at least one persona, using a neural network, and provide the converted at least one sentence.

In various embodiments, the electronic device may further include a display device, wherein the at least one processor may be configured to, through the display device, display one or more personas for recommendation to a user, in response to an input for selecting at least one persona of the one or more displayed personas, select at least one persona, and determine the at least one selected persona as the at least one persona.

In various embodiments, the at least one processor may be configured to convert the sentence to at least one sentence having a style corresponding to the determined at least one persona, and display the at least one converted sentence through the display device.

In various embodiments, the at least one processor may be configured to receive an input for selecting one or more sentences from the at least one displayed sentence, and in response to receiving the input, store the one or more selected sentences in the memory in response to an input requesting information, received from an external device.

In various embodiments, the at least one processor may be configured to receive an input for modifying one or more sentences among the at least one displayed sentence, and in response to receiving the input, store the one or more modified sentences in the memory in response to an input for requesting information, received from an external device.

In various embodiments, the at least one processor may be configured to determine the at least one persona, based on information of a service provided by a user of the electronic device or the user of the electronic device.

In various embodiments, the at least one processor may be configured to convert the sentence to at least one sentence having a style corresponding to the at least one persona, using a style transfer model trained using the neural network and corresponding to each of the at least one persona.

In various embodiments, the at least one processor may be configured to receive an input for requesting information from an external device, based on receiving the input, identify information of a user of the external device, determine a persona based on the user information of the external device, convert a response sentence for the request to a response sentence having a style corresponding to the determined persona, and provide the converted response sentence to the external device.

In various embodiments, the at least one processor may be configured to receive an input for requesting information from an external device, based on receiving the input, identify content contained in the information, determine the persona based on the content information, convert the response sentence for the request to a response sentence having a style corresponding to the determined persona, and provide the converted response sentence to the external device.

In various embodiments, the at least one processor may be configured to generate a persona related to a user of the external device or a persona related to a user of the electronic device, based on statistics of information requested from the external device or statistics of a response for a request inputted from the user of the electronic device.

Figure 5:
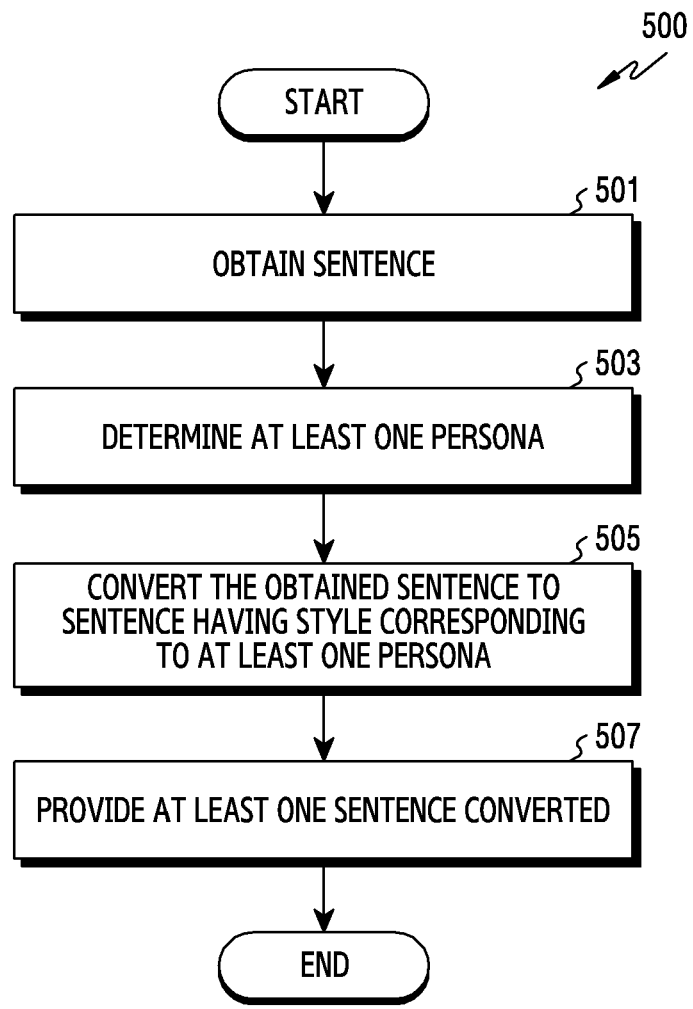
FIG. 5 is a flowchart for illustrating a method for providing a sentence based on a persona, according to various embodiments.

FIG. 5 is a flowchart 500 for illustrating a method for providing a sentence based on a persona, according to various embodiments. For example, FIG. 5 may be an overall flowchart 500 of the method for providing the sentence based on the persona.

Referring to FIG. 5, in operation 501, in an embodiment, the processor 260 may obtain a sentence based on a user input.

For example, the processor 260 may receive (or receive an input) a text input to be intent-matched to a voice input received from the client device, from the user. After receiving the text input, the processor 260 may receive, from the user, a first response sentence for the received text input (or in response to the received text input).

In operation 503, in an embodiment, the processor 260 may determine at least one persona, based on obtaining the sentence.

For example, based on obtaining the first response sentence, the processor 260 may determine at least one persona for generating a second response sentence (or corresponding to a style of the second response sentence).

In an embodiment, based on obtaining the first response sentence, the processor 260 may determine one or more personas corresponding to one or more style transfer modules among all of the style transfer models stored in the memory 250 as personas for generating second response sentences.

In an embodiment, based on obtaining the first response sentence, the processor 260 may determine at least one persona selected by the user of the device 101, among the one or more personas corresponding to the one or more style transfer modules of all of the style transfer models stored in the memory 250, as at least one persona for generating at least one second response sentence.

For example, based on obtaining a response sentence inputted by the user, the processor 260 may display information indicating the one or more personas corresponding to the one or more style transfer modules of all of the style transfer models stored in the memory 250 through the display device 230 to recommend it to the user. Based on a user input for selecting at least one persona in the information indicating the one or more personas, the processor 260 may determine the at least one selected persona as at least one persona for generating the second response sentence.

In an embodiment, based on a service (or a product, or content) provided by the user of the electronic device 101, the processor 260 may determine at least one persona. For example, if the user of the electronic device 101 is a service provider which provides a service for providing women's clothing information, the processor 260 may determine a persona (e.g., a female character) related to the women's clothing information as the persona for generating at least one second response sentence.

In an embodiment, the processor 260 may determine at least one persona, based on information (or profile information) of the user of the client device or the user (or the developer) of the electronic device 101. For example, the processor 260 may determine the persona (or the persona generated by characterizing the client user by reflecting the language features of the client user) for the user of the client device as the persona for generating at least one second response sentence, based on the statistics (or history, or log of the input) of the input (e.g., the voice input for executing the command) inputted from the user of the client device. As anther example, the processor 260 may determine the persona (or the persona generated by characterizing the electronic device 101 user by reflecting the language features of the user of the electronic device 101) for the user of the electronic device 101 as the persona for generating at least one second response sentence, based on the statistics of the input (e.g., the voice input for executing the command) inputted from the user of the electronic device 101.

In operation 505, in an embodiment, the processor 260 may convert the obtained sentence to at least one sentence having a style corresponding to the at least one persona determined, using the neural network.

For example, the processor 260 may convert the first response sentence to at least one second response sentence having the style corresponding to at least one persona determined, using the neural network.

In an embodiment, the processor 260 may generate (or acquire) at least one second response sentence, by converting the first response sentence to at least one second response sentence having the style corresponding to the at least one persona determined, using at least one style transfer module corresponding to the at least one persona determined, trained through the neural network.

In an embodiment, the processor 260 may convert the first response sentence, to at least one sentence having the style corresponding to the persona selected by the user of the electronic device 101 among the one or more personas corresponding to the one or more style transfer modules of all of the style transfer models stored in the memory 250.

In operation 507, in an embodiment, the processor 260 may provide the at least one sentence transferred.

For example, the processor 260 may output at least one sentence transferred through operation 505, through the display device 230.

In an embodiment, the processor 260 may output at least one sentence having the style corresponding to the selected persona (e.g., the sentence transferred through operation 505) through the display device 230, together with the persona selected by the user (e.g., the persona selected through operation 503).

In an embodiment, the processor 260 may determine one or more sentences selected by the user of the electronic device 101, among at least one sentence outputted, as one or more sentences to be provided as a response to the text input (e.g., the input sentence inputted for the intent matching) to be used for the intent matching (or to be intent matched with the voice input received from the client device) or a response to the user input received from the client device. In an embodiment, the processor 260 may store the one or more determined sentences in the memory 250.

Figure 6:
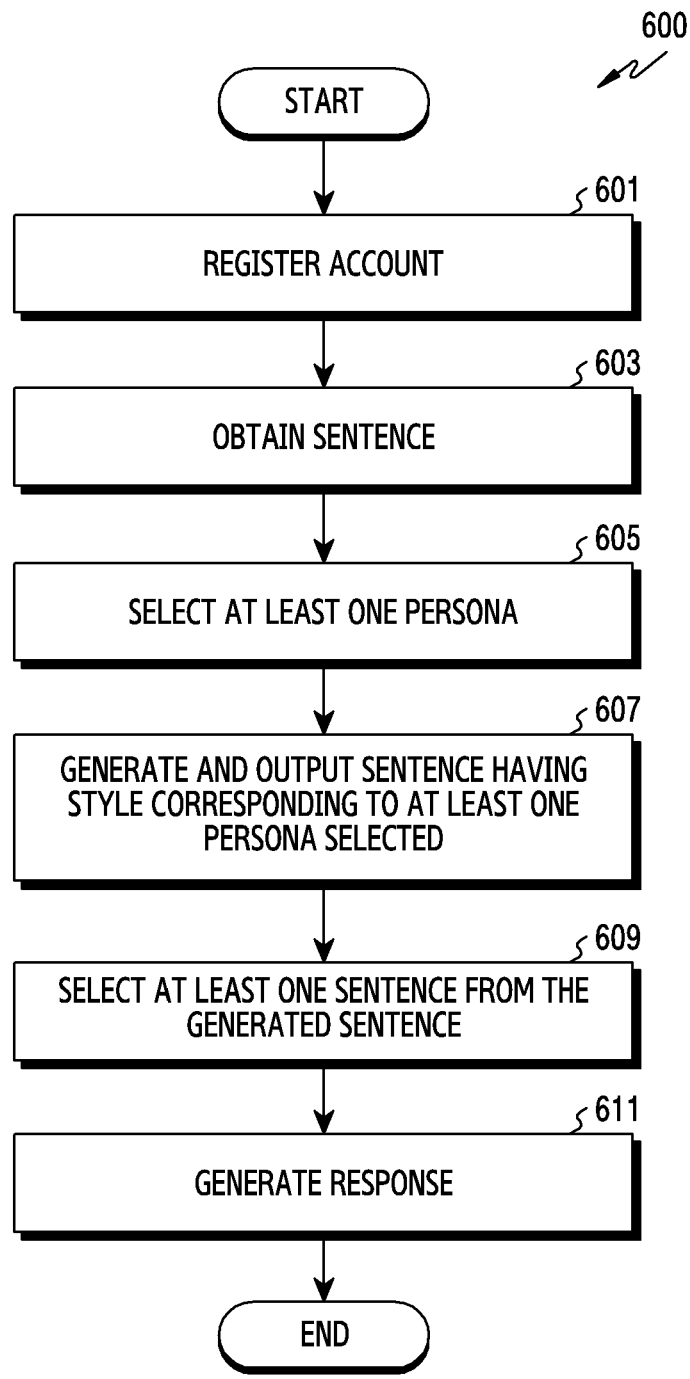
FIG. 6 is a flowchart for illustrating a method for generating an interactive system, according to various embodiments.

FIG. 6 is a flowchart 600 for illustrating a method for generating an interactive system, according to various embodiments. For example, FIG. 6 may be the flowchart 600 of the method for generating the interactive system using an API service (e.g., a chatbot builder service).

Referring to FIG. 6, in operation 601, in an embodiment, the processor 260 may register a user's account of the electronic device 101 to generate the interactive system (e.g., a chatbot). For example, the processor 260 may register the account of the user of the electronic device 101 to an API service (e.g., a chatbot builder service) to create a chatbot for the user (or the developer), based on a user input.

In operation 603, in an embodiment, the processor 260 may obtain a sentence based on a user input. For example, the processor 260 may receive (or receive an input) a text input to be intent-matched with a voice input received from the client device, from the user. After receiving the text input, the processor 260 may receive, from the user, a first response sentence for the received text input (or in response to the received text input).

In operation 605, in an embodiment, the processor 260 may determine at least one persona, based on obtaining the sentence.

For example, the processor 260 may determine, based on obtaining the first response sentence, at least one persona for generating a second response sentence (or corresponding to a style of the second response sentence).

In an embodiment, based on obtaining the first response sentence, the processor 260 may determine one or more personas corresponding to one or more style transfer modules among all the style transfer models stored in the memory 250 as personas for generating the second response sentences.

In an embodiment, based on obtaining the first response sentence, the processor 260 may determine at least one persona selected by the user of the device 101, among the one or more personas corresponding to the one or more style transfer modules of the entire style transfer models stored in the memory 250, as at least one persona for generating at least one second response sentence.

For example, based on obtaining a response sentence inputted by the user, the processor 260 may display information indicating one or more personas corresponding to the one or more style transfer modules of the entire style transfer models stored in the memory 250 through a display device to recommend it to the user. Based on a user input for selecting at least one persona in the information indicating the one or more personas, the processor 260 may determine the at least one selected persona as at least one persona for generating the second response sentence.

In operation 607, in an embodiment, the processor 260 may generate and output a sentence having a style corresponding to the at least one persona selected.

In an embodiment, the processor 260 may convert the obtained sentence to at least one sentence having the style corresponding to the at least one selected persona, using the neural network.

For example, the processor 260 may convert the first response sentence to at least one second response sentence having the style corresponding to the at least one persona selected, using the neural network.

In an embodiment, the processor 260 may generate (or acquire) at least one second response sentence, by converting the first response sentence to at least one second response sentence having the style corresponding to the at least one selected persona, using at least one style transfer module corresponding to the at least one selected persona, trained through the neural network.

In an embodiment, the processor 260 may display at least one sentence having the style corresponding to at least one generated persona through the display device 230, together with the persona selected by the user (e.g., the persona selected in operation 605).

In operation 609, in an embodiment, the processor 260 may select one or more sentences from the at least one sentence outputted, based on a user input.

In an embodiment, the processor 260 may modify at least part of the one or more sentences selected based on the user input, among the at least one sentence outputted.

In an embodiment, the processor 260 may input an additional (or new) sentence based on a user input, in addition to the at least one sentence outputted.

In an embodiment, if at least part of the one or more selected sentences is modified or an additional sentence is inputted, the processor 260 may store the modified or inputted sentence, and use it to train the problem_transfer model.

In operation 611, in an embodiment, the processor 260 may generate a response based on the one or more selected sentences.

In an embodiment, the processor 260 may determine the one or more selected sentences (or the one or more selected sentences and the sentence modified or additionally inputted) as one or more sentences to be provided in response to the text input to be used for the intent matching or in response to the user input received from the client device.

In an embodiment, the processor 260 may store the one or more determined sentences in the memory 250.

Figure 7:
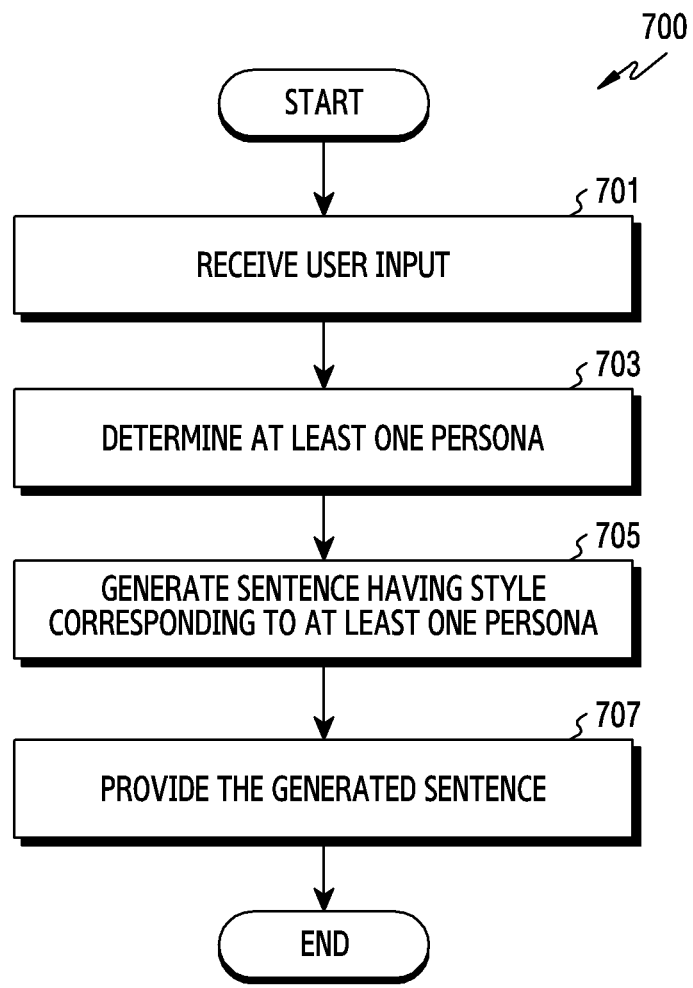
FIG. 7 is a flowchart for illustrating a method for providing a sentence based on a persona based on an input from a client device, according to various embodiments.

FIG. 7 is a flowchart 700 for illustrating a method for providing a sentence based on a persona based on an input from a client device, according to various embodiments. For example, FIG. 7 is the flowchart 700 of the method for providing a response to a user input received from the client device.

Referring to FIG. 7, in operation 701, in an embodiment, the processor 260 may receive a user input from the client device. For example, the processor 260 may receive the user input for executing a command from the client device, through the communication module.

In operation 703, in an embodiment, the processor 260 may determine at least one persona for providing a response.

In an embodiment, the processor 260 may determine a persona for providing the response, based on the user information of the client device. For example, if the user of the client device is a user residing in an area using a specific dialect, the processor 260 may determine a persona related to the specific dialect as the persona for providing the response.

In an embodiment, the processor 260 may determine a persona for providing a response, based on the user information of the client device and a persona selected by the user of the electronic device 101 while generating the interactive system (e.g., the chatbot) (e.g., at least one response sentence corresponding to a persona selected by the user of the electronic device 101) (e.g., a personal selected by the user in operation 605 of FIG. 6, or one or more sentences selected by the user in operation 609 of FIG. 6). For example, the processor 260 may determine a persona (e.g., a persona related to the age of 30s) corresponding to the user information (e.g., information that the user's age is 30s) of the client device among at least one persona selected by the user of the electronic device 101 while generating the interactive system (e.g., the chatbot) as the persona for providing the response.

In an embodiment, the processor 260 may determine a persona for providing a response, based on the user information of the electronic device 101. In an embodiment, the processor 260 may determine a persona for providing a response, based on a service (or content) provided by the user of the electronic device 101. For example, if the service provided by the user of the electronic device 101 is a service for providing cocktail information, the processor 260 may determine a persona related to a professional bartender as the persona for providing the response.

In an embodiment, the processor 260 may determine a persona for providing a response, based on content requested by the user of the client device. For example, if the user of the client device requests infant content information, the processor 260 may determine a persona related to the infant as the persona for providing the response.

In an embodiment, the processor 260 may determine a persona for providing a response, based on the user setting of the electronic device 101. For example, if the user of the electronic device 101 sets the first persona as the persona for providing the response, the processor 260 may determine the first persona as the persona for providing the response.

In operation 705, in an embodiment, the processor 260 may generate a sentence having a style corresponding to the determined persona.

In an embodiment, the processor 260 may generate a sentence having the style corresponding to the determined persona using the style transfer module corresponding to the determined persona.

For example, the processor 260 may generate a sentence having the first style in response to the received user input of the client device. The processor 260 may generate the sentence as the response, by converting the generated sentence having the first style to a sentence having the second style corresponding to the persona using the style transfer module corresponding to the determined persona.

In operation 707, in an embodiment, the processor 260 may provide the generated sentence to the client device. For example, the processor 260 may provide the generated sentence to the client device, through the communication module 210.

FIG. 8 is a diagram for illustrating a method for selecting a persona for providing a response by a user of an electronic device 101, according to various embodiments.

Referring to FIG. 8, in an embodiment, FIG. 8 may show a screen 800 for selecting a persona to provide a response, based on an input from the user of the electronic device 101.

In an embodiment, the processor 260 may receive a user input for inputting an intent name such as 'product advertisement'.

In an embodiment, the processor 260 may receive a user input for inputting an event name such as 'guide promotion'.

In an embodiment, the processor 260 may display information indicating one or more personas through the display device 230 to recommend to the user.

In an embodiment, the processor 260 may select a persona, by selecting at least one of information indicating one or more personas displayed on the display device 230, based on a user input. For example, as shown in FIG. 8, the processor 260 may select the personal related to the age group (e.g., 10s, 20s, 30s, 40s through 50s, 60s and above), the gender (male and female), or the linguistic personality (e.g., friendly, assertive), or a combination thereof, based on the user input.

Figure 9:
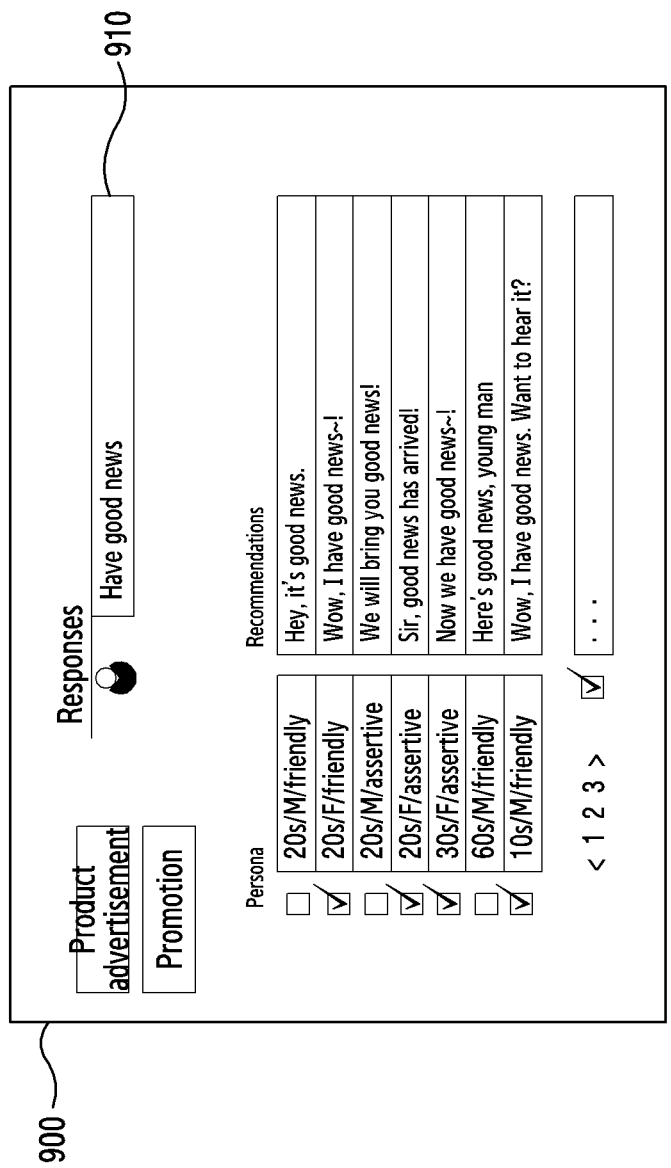
FIG. 9 is a diagram for illustrating a method for determining a sentence having a style corresponding to a persona by a user of an electronic device, according to various embodiments.

FIG. 9 is a diagram for illustrating a method for determining a sentence having a style corresponding to a persona by a user of an electronic device 101, according to various embodiments.

Referring to FIG. 9, in an embodiment, FIG. 9 may show a screen 900 for determining at least one sentence to be provided as a response, based on an input from the user of the electronic device 101.

In an embodiment, the processor 260 may receive a user input for inputting a first response sentence such as 'Have good news'.

In an embodiment, the processor 260 may output at least one sentence having a style corresponding to the selected persona (e.g., the persona selected in FIG. 8). For example, the processor 260 may output a sentence such as 'Hey, it's good news' with a style corresponding to a persona related to the age of 20s, the gender of male, and the linguistic personality of friendly.

In an embodiment, the processor 260 may select one or more sentences, based on a user input, among at least one sentence outputted.

In an embodiment, the processor 260 may modify at least part of one or more sentences selected based on the user input, in at least one sentence outputted.

In an embodiment, the processor 260 may input an additional (or new) sentence based on a user input, in addition to at least one sentence outputted.

In an embodiment, if at least part of the one or more selected sentences is corrected or an additional sentence is inputted, the processor 260 may store the modified or inputted sentence, and use it to train the problem transfer model.

In an embodiment, processor 260 may determine the one or more selected sentences (or the one or more selected sentences and the sentence modified or additionally inputted) as one or more sentences to be provided in response to the text input to be used for the intent matching or in response to the user input from the client device.

In an embodiment, the processor 260 may store the one or more determined sentences in the memory 250.

A method according to various embodiments of the present invention may include obtaining a sentence based on a user input, based on obtaining the sentence, determining at least one persona, converting the sentence to at least one sentence having a style corresponding to the at least one persona, using a neural network, and providing the converted at least one sentence.

In various embodiments, determining at least one persona may include displaying one or more personas through a display device for recommendation to a user, in response to an input for selecting at least one persona of the one or more displayed personas, selecting at least one persona, and determining the at least one selected persona as the at least one persona.

In various embodiments, converting the sentence to the at least one sentence having the style corresponding to the at least one persona may include converting the sentence to at least one sentence having the style corresponding to the determined at least one persona, and providing the converted at least one sentence may include displaying the at least one converted sentence through the display device.

In various embodiments, the method may further include receiving an input for selecting one or more sentences from the at least one displayed sentence, and in response to receiving the input, storing the one or more selected sentences in the memory in response to an input requesting information, received from an external device.

In various embodiments, the method may further include receiving an input for modifying one or more sentences among the at least one displayed sentence, and in response to receiving the input, storing the one or more modified sentences in the memory in response to an input for requesting information, received from an external device.

In various embodiments, determining the at least one persona may include determining the at least one persona, based on information of a service provided by a user of the electronic device or the user of the electronic device.

In various embodiments, converting the sentence to the at least one sentence having the style corresponding to the at least one persona may include converting the sentence to at least one sentence having a style corresponding to the at least one persona, using a style transfer model trained using the neural network and corresponding to each of the at least one persona.

In various embodiments, the method may further include receiving an input for requesting information from an external device, based on receiving the input, identifying information of a user of the external device, determining a persona based on the user information of the external device, converting a response sentence for the request to a response sentence having a style corresponding to the determined persona, and providing the converted response sentence to the external device.

In various embodiments, the method may include receiving an input for requesting information from an external device, based on receiving the input, identifying content contained in the information, determining the persona based on the content information, converting the response sentence for the request to a response sentence having a style corresponding to the determined persona, and providing the converted response sentence to the external device.

In addition, a data structure used in the above-described embodiment of the present invention may be recorded on a computer-readable recording medium through various means. The computer-readable recording medium includes a storage medium such as a magnetic storage medium (e.g., a read only memory (ROM), a floppy disk, a hard disk, etc.), an optical reading medium (e.g., compact disk (CD)-ROM, a digital versatile disk (DVD), etc.).

In an embodiment, a computer-readable recording medium may record a program for obtaining a sentence based on a user input, based on obtaining the sentence, determining at least one persona, converting the sentence to at least one sentence having a style corresponding to the at least one persona, using a neural network, and providing the converted at least one sentence, in an electronic device.

So far, preferred embodiments of the present invention have been described. Those skilled in the art of the technical field which the present invention belongs to will appreciate that the present invention may be implemented in a modified form without departing from the essential characteristics of the present invention. Therefore, the disclosed embodiments should be considered in a descriptive sense and not in a restrictive sense. The scope of the present invention is disclosed in the claims, not in the above-stated descriptions, and all differences within the equivalent scope should be construed as being included in the present invention.

The invention claimed is:

1. An electronic device comprising:
a memory; and
at least one processor,
wherein the at least one processor is configured to:
receive a user input for requesting a content, in response to obtaining the user input, identify at least one word representing the requested content in the sentence,
determining at least one persona related to the requested content, based on the at least one word,
acquire a first response sentence corresponding to the user input and the requested content,
convert the first response sentence to at least one second response sentence having a style corresponding to the at least one persona, using a neural network,
based on at least one of speech rate, accent, pitch, or habit of the at least one persona, change the at least one second response sentence to voice-type information, and
provide the voice-type information through sound output device.

2. The electronic device of claim 1, further comprising:
a display device,
wherein the at least one processor is configured to:
through the display device, display one or more personas for recommendation to a user,
in response to an input for selecting at least one persona of the one or more displayed personas, select at least one persona, and
determine the at least one selected persona as the at least one persona.

3. The electronic device of claim 2, wherein the at least one processor is configured to:
convert the first response sentence to the at least one second response sentence having a style corresponding to the determined at least one persona, and
display the at least one converted second response sentence through the display device.

4. The electronic device of claim 3, wherein the at least one processor is configured to:
receive an input for selecting one or more sentences from the at least one displayed second response sentence, and
in response to receiving the input, store the one or more selected sentences in the memory in response to the user input for requesting information, received from an external device.

5. The electronic device of claim 3, wherein the at least one processor is configured to:
receive an input for modifying one or more sentences among the at least one displayed second response sentence, and
in response to receiving the user input, store the one or more modified sentences in the memory in response to an input for requesting information, received from an external device.

6. The electronic device of claim 1, wherein the at least one processor is configured to:
determine the at least one persona, based on information of a service provided by a user of the electronic device or the user of the electronic device.

7. The electronic device of claim 1, wherein the at least one processor is configured to:
convert the first response sentence to the at least one second response sentence having a style corresponding to the at least one persona, using a style transfer model trained using the neural network and corresponding to each of the at least one persona.

8. The electronic device of claim 1, wherein the at least one processor is configured to:
in response to receiving an input for requesting information from an external device,
identify information of a user of the external device, and
determine a persona based on the user information of the external device.

9. The electronic device of claim 1, wherein the at least one processor is configured to:
generate a persona related to a user of the external device or a persona related to a user of the electronic device, based on statistics of information requested from the external device or statistics of a response for a request inputted from the user of the electronic device.

10. A method comprising:
receiving a user input for requesting a content; in response to obtaining the user input, identify at least one word representing the requested content, determining at least one persona related to the requested content, based on the at least one word acquiring a first response sentence corresponding to the user input and the requested content;

converting the first response sentence to at least one second response sentence having a style corresponding to the at least one persona, using a neural network;

based on at least one of speech rate, accent, pitch, or habit of the at least one persona, changing the at least one second response sentence to voice-type information, and providing voice-type information through sound output device.

11. The method of claim 10, wherein determining at least one persona comprises:
displaying one or more personas through a display device for recommendation to a user;
in response to an input for selecting at least one persona of the one or more displayed personas, selecting at least one persona; and
determining the at least one selected persona as the at least one persona.

12. The method of claim 11, wherein converting the first response sentence to the at least one second response sentence comprises:
converting the first response sentence to the at least one second response sentence having the style corresponding to the determined at least one persona; and
displaying the at least one converted second response sentence through the display device.

13. The method of claim 12, further comprising:
receiving an input for selecting one or more sentences from the at least one displayed second response sentence; and
in response to receiving the input, storing the one or more selected sentences in the memory in response to the user input.

14. The method of claim 12, further comprising:
receiving an input for modifying one or more sentences among the at least one displayed second response sentence; and
in response to receiving the input, storing the one or more modified sentences in the memory in response to the user input.

* * * * *